United States Patent Office 2,801,473
Patented Aug. 6, 1957

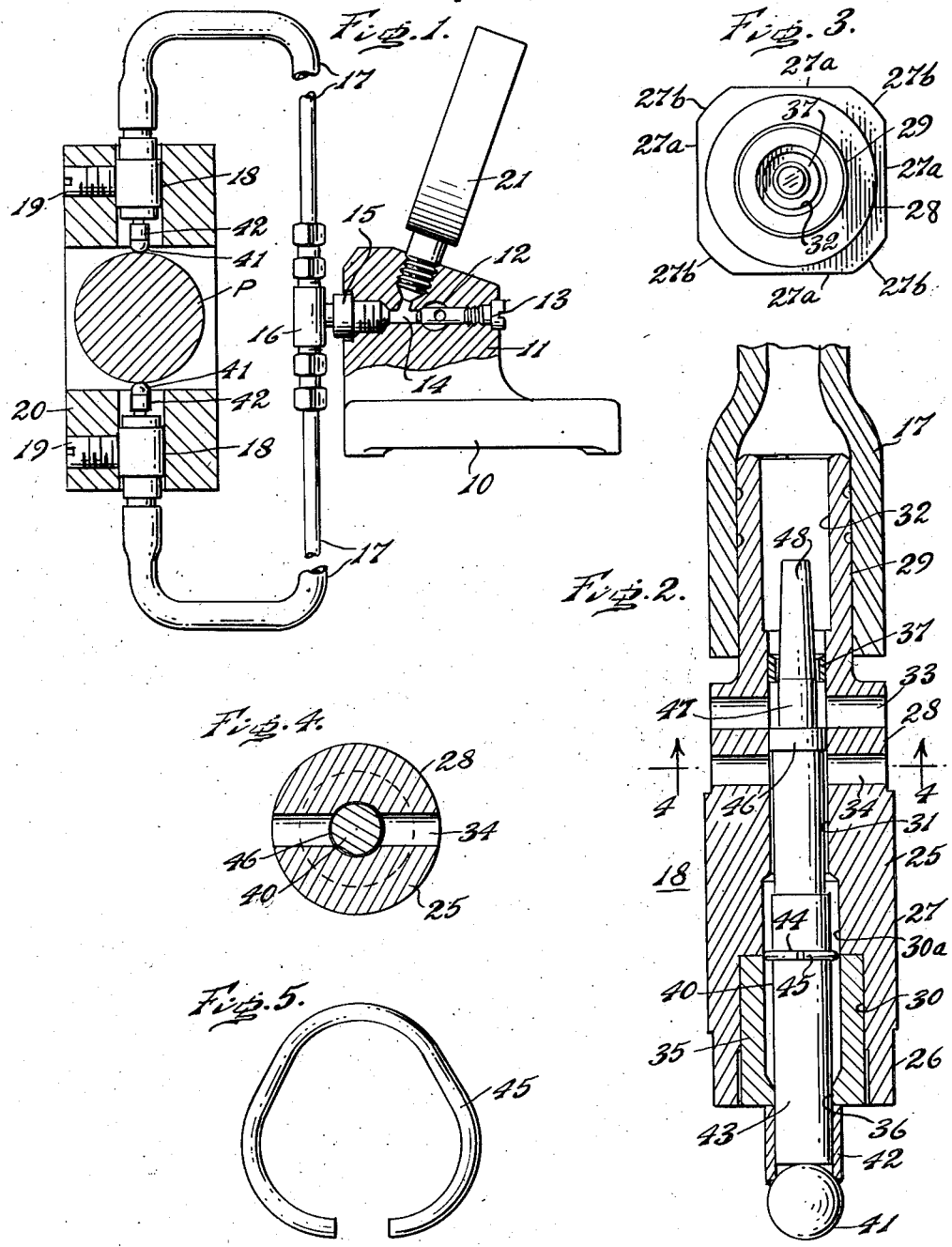

2,801,473

PNEUMATIC GAGING APPARATUS

David B. Kirk, Oreland, Pa., assignor to Moore Products Co., Philadelphia, Pa., a corporation of Pennsylvania Application September 11, 1956, Serial No. 609,118

10 Claims. (Cl. 33—147)

This invention relates to pneumatic gaging apparatus and more particularly to a gaging unit having a wide range of application.

Pneumatic gages have heretofore been proposed operating upon the principle that if a fluid under constant pressure is forced through up-stream and down-stream orifices in series with one another, the gaseous pressure in the space between the orifices will be a function of the relative sections of the orifices and the measurement of the gaseous pressure in the space will indicate the effective area of the down-stream or discharge orifice, as varied by the position or dimensional relation with respect thereto of the work piece or a control element positioned by the work piece, within certain limits.

Pneumatic gages have also been proposed in which a gaging element is provided in a fluid leakage path, variable in accordance with the spacing of the work piece with respect to a gaging nozzle or to a control element for the nozzle positioned by the work piece, and in which the leakage path has an associated rate of flow indicator, operating from a constant fluid pressure supply, for determination of the dimensional relation or spacing of the work piece with respect to the gaging nozzle or nozzle control element.

In accordance with the present invention a gaging unit is provided for use with various types of gaging circuits and having the gaging orifice interiorly disposed therein with an exteriorly extending control element.

In accordance with the present invention a gaging unit is provided which is small and compact so that it can be used in a wide range of applications, both near and remote, which can be conveniently mounted in a round hole or clamped against a flat surface.

In accordance with the present invention a gaging unit is provided in which the clamping or holding is effected at a location so as to avoid interference with interiorly disposed guiding and gaging surfaces.

In accordance with the present invention a gaging unit is provided having a gage plunger urged outwardly by the pressure of the gaging fluid so that no internal springs are required.

In accordance with the present invention a gaging unit is provided having a gage plunger which is normally limited in its outward movement in a simple but effective manner but which can be withdrawn manually by an outward movement if desired.

In accordance with the present invention a gaging unit is provided having an interiorly disposed guiding surface which unit is easily manufactured.

In accordance with the present invention a gaging unit is provided having a gage plunger which is guided at a plurality of spaced locations.

Other objects and advantageous features of the invention will be apparent from the description and claims.

The nature and characteristic features of the invention will be more readily understood from the following description, taken in connection with the accompanying drawings forming part thereof, in which:

Figure 1 is an elevational view partly in vertical section of pneumatic gaging apparatus employing the gaging units in accordance with the invention;

Fig. 2 is a longitudinal central sectional view, greatly enlarged, of one of the gaging units;

Fig. 3 is an end elevational view of Fig. 2, the tube having been removed;

Fig. 4 is a transverse sectional view taken approximately on the line 4—4 of Fig. 2; and Fig. 5 is a view in elevation, still further enlarged, of the limiting spring clip removed from the gage plunger.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to Fig. 1 of the drawings, the pneumatic gage there shown merely by way of illustration is of the external type for measuring external diameters, and taper or out of round conditions.

The gage is shown as including a base or stand 10 having an upstanding or upright portion 11 with a supply connection 12 to which gaging fluid is supplied, preferably at substantially constant pressure and preferably consisting of pressure regulated and filtered air.

The supply connection 12 is in communication, through a restriction member 13, with an interior passageway 14, the pressure in the passageway 14 being available for measurement. Threaded into the upright portion 11 and in communicatioin with the passageway 14, an adapter fitting 15 is provided with which a T-fitting 16 is in engagement. The fitting 16 has flexible tubes 17 connected thereto which extend to gaging units 18 in accordance with the invention. The gage units 18 can be clamped at any desired location, such as by set screws 19 in a gaging fixture 20, with the work piece P to be measured for insertion between the gage units 18.

The upright portion 11 has mounted thereon a pressure responsive member 21, such as a Bourdon dial type pressure gage, in communication with the interior passageway 14. The pressure responsive member 21 is preferably calibrated in dimensional units.

The gage units 18 are not restricted for use with the particular gaging circuit illustrated or with the particular stand and connections shown.

Referring now more particularly to Figs. 2 to 5, inclusive, the gaging unit 18 there shown preferably includes an elongated substantially cylindrical body 25 which may, for a particular embodiment of the invention, have a length of the order of one inch. The body 25 has an exterior circular cylindrical end portion 26, an intermediate substantially cylindrical clamping portion 27 with four flat side faces 27a for flat clamping connected by four circular arcuate side faces 27b for reception in a circular opening, an intermediate cylindrical relief portion 28 of reduced diameter, and a reduced circular cylindrical end portion 29 of further reduced diameter for the attachment of a tube 17. The portions 26, 27, 28 and 29 are in longitudinal axial alignment. For one particular embodiment of the invention the diametrical distance between the curved side faces 27b can be of the order of three eighths of an inch.

Within the interior of the body 25 and extending partly within the confines of the clamping portion 27, a bore 30 is provided which is relieved at its outer end. The bore 30 has longitudinally axially aligned therewith and extending therefrom a bore 30a from which a reduced bore 31 extends to a location within the confines of the end portion 29. The end portion 29 has an enlarged bore 32 extending therein.

From the bore 31 opposed radially extending relief passageways 33 and 34 are provided terminating at the intermediate portion 28.

Within the bore 30 a guiding sleeve 35 is inserted and secured and the sleeve 35 has an inwardly extending guiding and locking hollow cylindrical rim 36.

At the end of the bore 31 a hollow cylindrical seat 37 is mounted having a predetermined internal diameter and with its bore concentric with the bore 31.

A gage plunger 40 is provided having a spherical ball 41 of ultra hard material such as tungsten carbide secured thereto for contact with the work piece P to be gaged, and a collar 42 for limiting the inward movement of the plunger 40 by its engagement with the outer end face of the body 25. The plunger 40 has a cylindrical surface portion 43 which is guided by the rim 36 and has a groove 44 therein for the reception of a limiting spring clip 45. The clip 45 shown enlarged and in detail in Fig. 5 normally projects outwardly of the groove 44 a sufficient distance to limit the free axial outward movement of the plunger 40 by its engagement at the rim 36 but can be compressed and contracted into the groove 44 by manual application of force on the exposed outer end of the plunger 40 and its engagement with the rim 36 to permit the withdrawal of the plunger 40. The plunger 40 can be inserted by pressing it inwardly to compress the spring clip 45 and force the compressed clip 45 past the rim 36 where it will again expand circumferentially.

The plunger 40 has, in spaced relation to the surface portion 43, a surface portion 46 for sliding engagement in the bore 31 to guide the plunger 40 in its longitudinal axial movement.

The plunger 40, beyond the guide surface portion 46, has a connecting portion 47 from which a tapered plug portion 48 extends for providing with the bore of the seat 37 a variable orifice the size of which is determined by the positioning of the plunger 40 by the work piece P.

With a gage unit 18 clamped or held at the desired position for use by engagement of clamping or holding structure with the clamping portion 27, gaging fluid at regulated pressure is supplied from the supply connection 12, and through the restriction member 13 to the interior passageway 14 and therefrom through the fittings 15 and 16 and the tubes 17 to the interior of the bore 32 where the pressure is effective to move the plunger 40 outwardly to its outer limit position as determined by the spring clip 45. Gaging fluid is permitted to escape through the orifice between the seat 37 and the tapered plug 48 and thence through the relief passageways 33 and 34.

If the plunger 40 is moved inwardly, positioned by the engagement between a work piece P and the ball 41, and against the pressure effect of the gaging fluid on the inner end of the plunger 40, the size of the orifice between the seat 37 and the tapered plug 48 will be determined and this, through its control of the discharge through that orifice, will determine the pressure in the passageway 14 to provide an indication at the pressure responsive gage member 21 for giving a dimensional reading. For a particular embodiment, a low gaging force, of the order of 30 to 40 grams, can be applied at the ball 41. With opposed gaging units 18 as illustrated in Fig. 1, an averaging effect is obtained within the gaging limits of the gaging units 18.

The plunger 40, in its movement, is guided by the rim 36 and the bore 32 which, by reason of their location, are free from stresses arising out of clamping the body 25 for mounting. The orifice between the seat 37 and the tapered plug 38 is also free from stresses arising from clamping for mounting.

The plunger 40 is restrained from undesired separation from the body 25 but can be easily removed from or inserted in the body 25.

I claim:

1. Pneumatic gaging apparatus comprising a body having at one end an inlet portion for connection to a supply of gaging fluid and having a longitudinal axial opening therethrough, said opening at the intermediate portion thereof having a guiding surface and having a seating portion between said guiding surface and said inlet portion, said opening at the other end of said body having another guiding surface in spaced relation to said first guiding surface, a gaging plunger having an exterior end for contact with the work to be gaged and extending into said opening in engagement with said guiding surfaces, said plunger having an exteriorly disposed inward movement limiting portion for engagement with said body and between said surfaces having an outwardly extending stop member for engagement with said second guiding surface for limiting the outward movement of said plunger, said plunger having a plug portion providing with said seating portion a variable orifice controlled by the positioning of said plunger.

2. Pneumatic gaging apparatus as defined in claim 1 in which said stop member comprises a diametrically expansible and contractible member seated in a groove on said plunger.

3. Pneumatic gaging apparatus as defined in claim 1 in which said stop member comprises a diametrically expansible and contractible member seated in a groove on said gaging plunger and being compressible into said groove for withdrawal of said gaging plunger.

4. Pneumatic gaging apparatus as defined in claim 1 in which an exterior clamping surface is provided on the body intermediate the ends of the body and the guiding surfaces are longitudinally axially therebeyond.

5. Pneumatic gaging apparatus as defined in claim 1 in which an enlarged exterior clamping surface is provided on the body intermediate the ends of the body and the guiding surfaces are longitudinaly axially therebeyond.

6. Pneumatic gaging apparatus as defined in claim 1 in which an exterior clamping surface is provided on the body intermediate the ends of the body and the seating member is longitudinally axially therebeyond.

7. Pneumatic gaging apparatus as defined in claim 1 in which an enlarged exterior clamping surface is provided on the body intermediate the ends of the body and the seating member is longitudinally axially therebeyond.

8. Pneumatic gaging apparatus as defined in claim 1 in which the body has intermediate its ends exterior clamping surfaces which include arcuate surfaces and interposed flat surfaces radially closer to the longitudinal axis than the arcuate surfaces.

9. Pneumatic gaging apparatus as defined in claim 1 in which the body has intermediate its ends exterior clamping surfaces which include arcuate surfaces and interposed flat surfaces diametrically closer than the arcuate surfaces.

10. Pneumatic gaging apparatus as defined in claim 1 in which the end of said opening opposite said inlet portion is enlarged and has a sleeve inserted therein in which said second mentioned guiding surface is disposed.

No references cited.